Sept. 27, 1960 J. W. HURST 2,954,021
SENSORY MECHANISM
Filed July 30, 1958 2 Sheets-Sheet 1
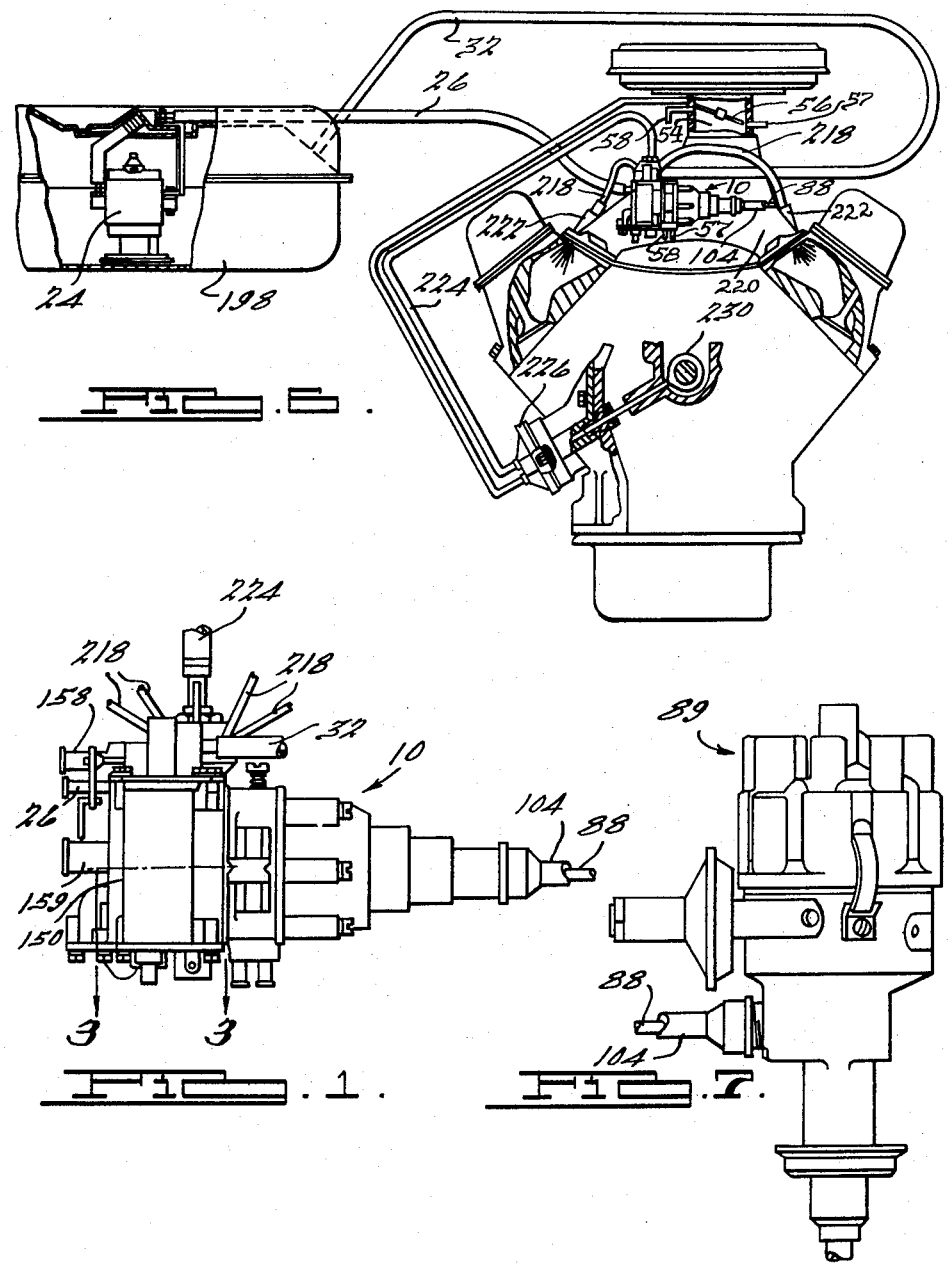
INVENTOR
JOHN W. HURST
By Harness and Harris
ATTORNEYS.

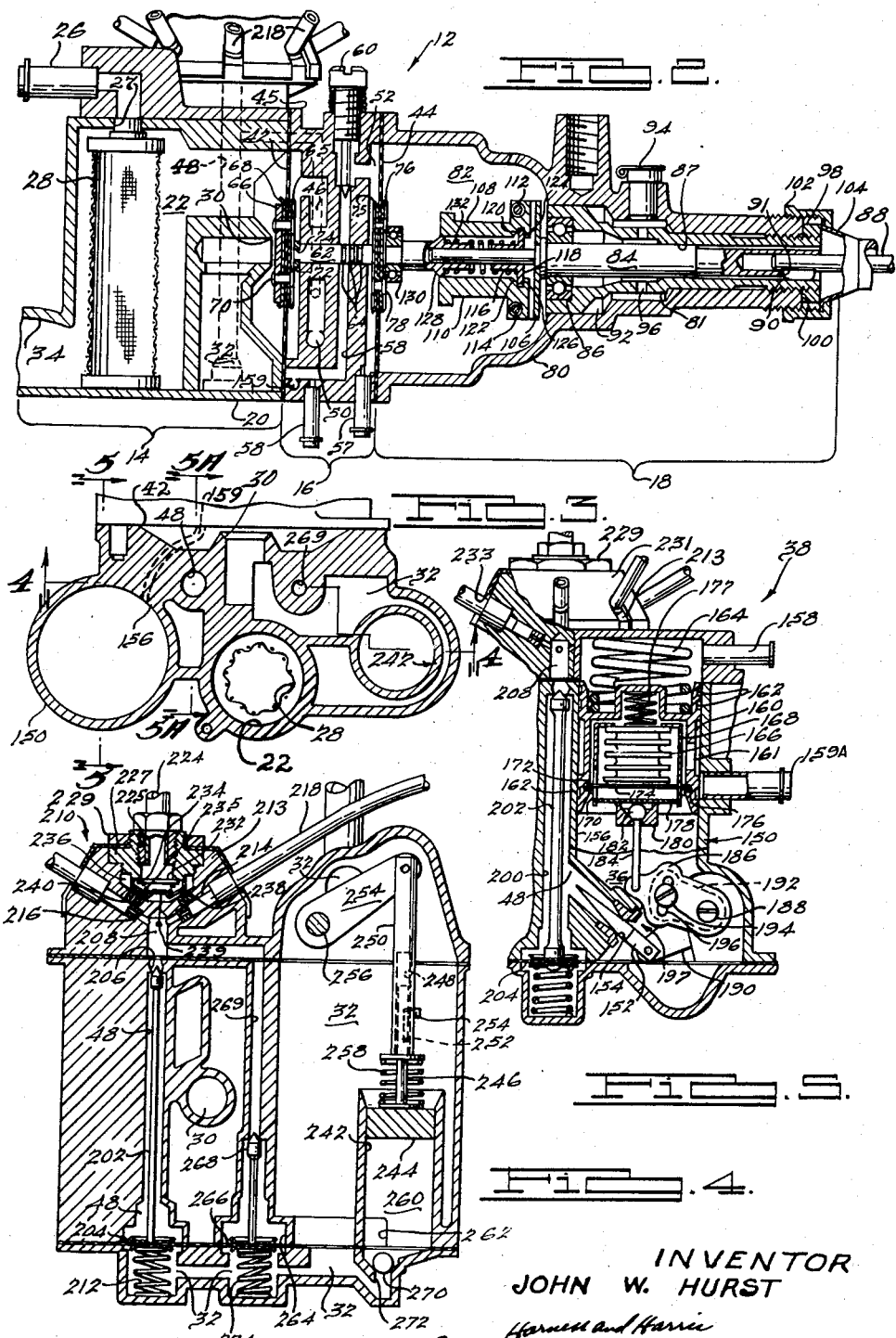

United States Patent Office 2,954,021
Patented Sept. 27, 1960

2,954,021

SENSORY MECHANISM

John W. Hurst, Royal Oak, Mich., assignor to Chrysler Corporation, Highland Park, Mich., a corporation of Delaware Filed July 30, 1958, Ser. No. 752,003

10 Claims. (Cl. 123—119)

This invention relates to a fuel injection system of the type disclosed in the following related co-pending applications owned by applicant's assignee and having the following filing dates: Thomas M. Ball et al., Serial No. 751,999, filed July 30, 1958, Clifford M. Elliott, Serial No. 752,000, filed July 30, 1958, Eugene P. Wise, Serial No. 752,005, filed July 30, 1958, Clifford M. Elliott, Serial No. 752,004, filed July 30, 1958.

This invention relates in particular to a unitary mechanism which is sensitive to changes in engine manifold pressure, atmospheric pressure, and atmospheric temperature, and to its incorporation into the fuel metering unit of a fuel injection system of an internal combustion engine wherein it is intended to be operatively associated with a fuel metering means for the purpose of adjusting said metering means to modify the rate of flow of fuel to the engine according to said changes in pressures and temperature.

Heretofore no satisfactory unitary mechanism for sensing changes in engine manifold pressure, atmospheric pressure, and atmospheric temperature, and responsive collectively thereto for adjusting fuel flow to an internal combustion engine has been devised. The separate sensory means heretofore employed for responding to each of these changes individually have disadvantages in that (1) the adjustments to be made on these separate means relative to the fuel metering means during the assembly thereof into a fuel metering unit and during the operation of the unit must be separately made with a resultant inherent adjustment inaccuracy in the total reactance effect of these separate means on the metering means, (2) the separate means require a larger mounting area within the fuel metering unit which area is undesirable from a standpoint of material weight, cost and size of the metering unit, and (3) many movable parts, particularly linkages, are required with the result of frequent breakdown of the mechanism and frequent adjustments of the linkages.

It is an object of this invention to provide a unitary and compact sensory structure adapted to adjust the fuel flow through a fuel metering unit according to changes in engine load and atmospheric pressure and temperature.

Another object is to provide a unitary sensory structure sensitive to changes in engine and atmospheric conditions and adapted to be connected to a means for effecting by a single adjustment the total reactance force of said sensory structure on a fuel metering member, resulting from said engine and atmospheric changes.

Another object is to provide a unitary and compact sensory structure adapted to adjust the fuel flow through a fuel metering unit according to changes in engine and atmospheric conditions and having a single linkage adapted to operatively connect said structure to a fuel metering valve in said fuel metering unit.

Another object is to provide a sensory mechanism having a manifold pressure responsive element and an atmospheric temperature and pressure responsive element connected together but being independently responsive, said mechanism adapted for connection to a fuel metering valve to adjust the same according to the net response of said elements.

Further objects and advantages of this invention will be apparent from the following detailed illustration thereof, reference being had to the accompanying drawings forming a part of this specification wherein like reference characters designate corresponding parts in the several views:

Figure 1 is a side elevational view of the fuel injection metering unit;

Figure 2 is substantially a vertical longitudinal midsectional view through the unit of Figure 1;

Figure 3 is a horizontal sectional view of the unit taken on line 3—3 of Figure 1, and rotated counterclockwise 90°;

Figure 4 is a vertical sectional view of the unit of Figure 1 taken along a line and in the direction corresponding to 4—4 of Figure 3;

Figure 5 is a vertical sectional view of the load sensor of Figure 1 taken along a line corresponding to 5—5 of Figure 3 in the direction of the arrows with parts broken away to show a section of the load metering orifice of Figure 1 taken along a line corresponding to 5A—5A of Figure 3 in the direction of the arrows;

Figure 6 is a view partly in cross section of the general arrangement of the fuel injection system and the engine; and Figure 7 is a side elevational view of an automotive distributor for driving the unit of Figure 1.

Referring in detail to the drawings, and in particular to Figures 1 and 2, a fuel injection metering unit designated generally as 10 is provided with a speed sensor designated generally as 12. This speed sensor is conveniently divided into three sections, a speed section 14, an intermediate section 16, and a governor section 18. All three of these sections cooperate simultaneously to adjust the amount of fuel available to the engine in accordance with the fuel requirements of the engine as related to engine speed.

The speed section 14 comprises a housing 20 having a chamber 22 therein to receive a constant supply of fuel supplied under pressure by the pump 24 (Figure 6) through the fuel conduit 26. Pump 24 may be electrically driven and its operating speed is independent of engine speed. A fuel filter chamber 28 located in chamber 22 actually receives the fuel initially and after filtering said fuel discharges it into chamber 22. A return flow metering orifice 30 on housing 20 provides a passage from chamber 22 to a return flow conduit 32 which winds throughout the unit 10 and provides numerous chambers as shown in Figures 2, 4, and 5. A fuel outlet 34 in housing 20 communicates with an upstream chamber 36 of the load sensor 38 to enable fuel which has not been returned to the fuel source through return flow conduit 32 to flow into chamber 36 (Figures 2 and 3).

The intermediate section 16 of the speed sensor 12 is separated from the speed section 14 and the governor section 18 by diaphragms 42 and 44 respectively. This section is provided with a housing 45 having a chamber 46 which communicates with the downstream chamber 48 of the load sensor 38 through a conduit 50 to provide equal fuel pressures in chambers 46 and 48 for a purpose to be explained below.

A chamber 52 in section 16 communicates with an intake manifold 54 of the engine at a point adjacent the throttle valve 56 through conduit 58 (Figures 2 and 6) and provides a substantially constant low pressure to the diaphragm 44 when the engine is idling and also provides an increased pressure when the throttle 56 is opened (see Figure 6). A conduit 58 of restricted size connects to the low pressure portion of manifold 54 and also serves to convey fuel passing the seals 64 to the intake manifold. Conduit 58 also connects by 159 to vent 159A and draws fresh air around bellows 166. An adjustable air bleed valve 60 communicating with chamber 52 allows air from 159 under substantially atmospheric pressure to bleed into chamber 52 to partially offset the low pressure therein from 57 and provides a means for adjusting the idling speed of the engine. It is noted that satisfactory operation of the system can be had without the port 57 shown in Figure 6 if conduit 57 is connected into the conduit 58 on the low pressure side of the restriction therein.

Referring again to Figure 2, a fuel return flow metering shaft 62 slidably mounted in housing 45 and provided with sliding sealing rings 64 is secured at one end to diaphragm 42 and valve disc 66 by flanges 65 and 68 and rivets 70. Disc 66 is movable with shaft 62 toward orifice 30 to retard the flow of return fuel therethrough to return flow conduit 32. A split retaining ring 72 positioned in a circumferential groove 74 in shaft 62 provides a stop to prevent valve disc 66 from moving too far from orifice 30. The other end of shaft 62 is connected to diaphragm 44 by flanges 75 and 76 and rivets 78.

Governor section 18 of the speed sensor comprises a housing 80 having a chamber 82 therein communicating with one side of diaphragm 44. The pressure in this chamber is at all times atmospheric and therefore allows a pressure differential to exist across diaphragm 44, since chamber 52 communicates at all times with the low pressure portion of the engine intake manifold. A shaft 84 is rotatably mounted in a sleeve member 81 in housing 80 by ball bearing 86 and bearing surface 87 on sleeve 81 and is keyed for rotation to a flexible drive shaft 88 of the engine distributor 89 (Figure 7) by key 90 on shaft 88 and slot 91 in shaft 84. The chamber 92 formed between member 81 and housing 80 serves as a lubricating oil reservoir for ball bearing 86 and bearing surface 87. The oil is introduced into oil cup 94 and flows to said ball bearing and bearing surface through apertures 96 in member 81.

An end of member 81 is threadably received in the end of housing 80 and is secured against rotatable movement therein by lock nut 98 threadably received on said end of member 81 and threaded into tight engagement with the end face 100 of housing 80. A nut 102 is threadably received on the end of housing 80 and secures the flexible drive shaft covering 104 to said housing. A governor body 106 is secured to shaft 84 for rotation therewith and pivotally supports flyweights 108 and 110 on bearings 112 and 114 respectively. A sleeve 116 having a flange 118 thereon is keyed to a reduced portion of shaft 84 and is slidable longitudinally of said portion. Slots 120 and 122 in flyweights 108 and 110 respectively loosely receive flange 118 which is abutted by shoulders 124 and 126 on flyweights 108 and 110 respectively. A sleeve 128 also longitudinally slidably mounted on said reduced portion of shaft 84 and keyed thereto for rotation therewith is secured at one end to the inner race of a ball bearing 130. Said sleeve 128 mounts on its other end a spring 132 which resiliently urges said sleeves 116 and 128 apart and causes the outer race of ball bearing 130 to abut the heads of rivets 78 with sufficient force to prevent the outer race from rotating with the inner race and shaft 84. The rotation of shaft 84 in response to the rotation of the flexible drive shaft 88 causes the flyweights 108 and 110 to pivot outwardly from shaft 84 around bearings 112 and 114 respectively, which brings shoulders 124 and 126 of the flyweights into contact with the flange 118 of sleeve 116 and tends to urge the latter against spring 132. The force transmitted to spring 132 is transmitted through the connected diaphragms to the return flow metering valve disc 66 and tends to move said disc closer to the orifice 30.

It is noted that the force output of a flyweight governor is mathematically speaking proportional to the square of the engine speed. Such a relationship between engine speed and force output, however, does not suffice for supplying fuel to the engine in accordance with the present metering unit since the air consumption of an internal combustion engine with respect to engine speed deviates from a linear relationship. This deviation is particularly noticeable in engines utilizing the ram type manifolds which manifolds are long enough to develop air pulsations therein which ram additional air into the engine cylinders and cause the engine to require more fuel to offset the leaning effect of the additional air. The relationship therefore between engine speed and governor force output is changed herein by the interposition of spring 132 between sleeves 116 and 128. This spring allows the radius of rotation of the centers of gravity of the flyweights to increase at a faster than normal rate with respect to engine speed over a portion of the speed range and to thereby exert a force on the spring, sleeve 128, and valve shaft 62 which force results in an increase in fuel flow to the engine over the amount which would flow at that speed in the absence of the spring. At high speed ranges during which the proportion of air consumption to engine speed decreases due to a reduction in the ram effect at such speeds, the sleeves 116 and 128 will abut each other and the radius of rotation of the centers of gravity of the flyweights will increase with further increases in engine speed at the normal or lower rate. This reduced rate of said radius increase will result in the force output of the governor also increasing at said normal or lower rate with respect to said further increase in engine speed, which reduced rate of force output will result in a flow of fuel to the engine which corresponds more nearly to the linear air consumption of said engine at high speeds.

The specific structure of the load sensor 38 with which the fuel outlet 34 of chamber 22 communicates is shown in Figures 3 and 5. The load sensor is conveniently divided into three sections for purposes of description. The first section 150 contains the mechanisms which are responsive to changes in manifold pressure and changes in atmospheric conditions to move through suitable linkages the load metering needle 152 with respect to the load metering orifice 154. The first section 150 comprises a cylinder 156 (Figures 3 and 5) having a manifold pressure inlet 158 which is operatively connected to the low pressure portion of the engine intake manifold. As shown in Figure 6, this portion may conveniently be chamber 54 which is downstream of primary throttle valve 56. A piston or thrust member 160 having dirt catching grooves 162 thereon is reciprocably mounted in cylinder or housing 156 and moves upwardly against spring 164 as the intake manifold pressure decreases. The increments of movement of piston 160 are substantially linear with respect to the incremental changes in the intake manifold pressure and provide a convenient basis for the design of load metering needle 152 and orifice 154 which design must be such as to obtain specific and predetermined flow characteristics across said orifice. The degree of the taper of needle 152, the length of the stroke of piston 160, and the size of orifice 154 are interrelated and are specifically predetermined. These dimensions must be such that the flow of fuel across orifice 154 can always be adjusted by the load sensor over the speed range of the engine to be substantially linear with respect to the total air flow to the engine as measured by the load sensor.

The air vent 159A communicating with conduit 58 in intermediate section 16 of the speed sensor (Figures 2 and 3) is provided in the housing of section 150 and allows atmospheric air to flow through slits 161 in the piston 160 and into contact with the exterior of an air tight flexible bellows 166 which is nested within the lower portion of piston 160. This bellows may be inherently partially evacuated to produce the desired force reactance. The low pressure in conduit 58 sucks a continuous flow of air past the bellows 166 which expands lengthwise in response to either a drop in atmospheric pressure or an increase in atmospheric temperature and conversely contracts lengthwise in response to increased atmospheric pressure or decreased atmospheric temperature. Said bellows is secured at its top end to a shell 168 having a plurality of circumferentially spaced slots 170 therein forming a plurality of spaced fingers, and is secured at its bottom end to plate 174 having fingers 172 which are slidably mounted in slots 170. Fingers 172 of plate 174 fit into grooves in the inner wall of piston 160 and are retained therein by split retaining ring 176. A spring 177 normally urges bellows 166 to a contracted condition. This spring augments the inherent spring rate of said bellows and provides a means to adjust the force reactance of the bellows should it be desired to vary the inherent pressure within said bellows. A plate 178 is secured to the lower end of shell 168 and carries a socket 180 into which a ball 182 of linkage rod 184 is retained. Said linkage rod is pivotally secured to arm 186 which is pivotally mounted on one end of shaft 188 which is rotatably mounted in the housing 150 and extends into chamber 36 of the second section 197 of the load sensor. An arm 190 secured to the other end of shaft 188 within section 197 is pivotally connected to the load metering needle 152. An arm 192 secured to shaft 188 adjacent the arm 186 is provided with a set screw 194 which extends through slot 196 in arm 186. Arms 186 and 192 may be moved relative to each other when the set screw is loose to adjust the position of the metering needle 152 with respect to orifice 154 at any desired operating condition of the load sensor, after which the set screw is tightened.

The second section 197 of the load sensor is separated from the first section 150 by suitable walls and fluid tight seals which keep the fluid in the upstream chamber 36 formed by section 197 from entering section 150. Chamber 36 receives its fuel supply from outlet 34 of chamber 22 of the speed section of the speed sensor which fuel represents the portion of the pumped fuel that is not returned to the fuel tank 198 (Figure 6) through the return flow conduit 32. Orifice 154 in section 197 connects chamber 36 to the downstream chamber 48 of the third section 200 of the load sensor. The total effect of the intake manifold pressure and the pressure and temperature of the atmosphere regulates the positioning of the metering needle 152 with respect to orifice 154 to control the flow of fuel therethrough into chamber 48.

Referring to Figures 3 and 4, a pressure valve needle 202 positioned in chamber 48 is attached to a diaphragm 204 and is normally urged to a closed position with respect to a fuel port 206 which communicates with the fuel distribution chamber 208 of rosette 210. The combined pressures exerted by the return fuel in conduit 32 and spring 212 urge needle 202 to its normally closed position. These pressures can be overcome by the pressure of the fuel flowing into chamber 48 when a predetermined minimum pressure of fuel in chamber 48 is attained. By establishing this minimum pressure in chamber 48 the formation of vapor in said chamber and in the rest of the system is retarded especially during starting and at slow engine speeds, and also the proper flow of fuel through the return flow conduit is insured since the resistance to said flow is overcome by the minimum pressure.

The rosette 210 in Figure 4 comprises a body 213 having a plurality of apertures 214 communicating with fuel chamber 208 across orifices 216. A nozzle feed conduit 218 is secured in each said aperture and communicates with a particular portion of the engine intake manifold 220 through a fuel injection nozzle 222 (Figure 6). An air conduit 224 has a threaded bushing 225 secured thereto which is threadably secured to body 213 by an intermediate valve carrying nut 227. A lock nut 229 secures the fuel feed conduit retaining plate 231 to the body 212 which plate urges the enlarged portions 233 of the nozzle feed conduits inwardly of the rosette to retain said conduits therein, see Fig. 5. Conduit 224 may be connected to an air pump 226 which is suitably mounted on the engine block 228 and actuated by the engine camshaft 230 (Figure 6). The use of this air pump is optional, however, a better control over the fuel atomization and dispersion has been obtained by using the pump and its use is advisable. A disc valve 232 normally urged against the inlet air port 234 of said rosette by spring 235 will prevent fuel from flowing into conduit 224 should something happen to the system to cause the fuel in the nozzle feed conduits to back up through orifices 240. Slots 238 in a valve retaining plate 239 permits the air to flow into chamber 236 after it passes through port 234. Air chamber 236 communicates with each said aperture 214 across orifices 240. As the air flows across orifices 240 it mixes with the fuel flowing across orifices 216 and forms a liquid in air type dispersion which then flows through the nozzle feed conduits to the fuel injection nozzles. It is noted that the close proximity of the orifices 216 and 240 prevents collection of liquid fuel on the downstream side of orifice 216. The air orifices 240 should be larger than the fuel orifices 216 since at idle and low fuel consumption conditions the volume of air used greatly exceeds the volume of fuel used.

Referring further to Figure 4 a cylinder 242 positioned in the return flow conduit 32 slidably receives an accelerator piston 244. Attached to the piston is a shaft 246 which is slidably received in a recess 248 in shaft 250. A groove 252 in shaft 246 slidably receives a screw 254 which limits the longitudinal movement of the shaft 246 and attached piston 244. An arm 254 is secured to shaft 250 at one end and to shaft 256 at its other end, which shaft 256 is operatively connected to the engine accelerator pedal and rotates clockwise in response to the depression of the pedal to urge shaft 250 against spring 258 to move piston 244 downward. As said piston is moved downward it forces fuel trapped in accelerator chamber 260 through conduit 262 and into chamber 264 where it exerts a force on diaphragm 266. When the pressure exerted on said diaphragm by the accelerator pump reaches a predetermined minimum, needle valve 268 will open and allow accelerator fuel to flow directly through conduit 269 to chamber 208 of the rosette for distribution to the fuel injection nozzles. A ball check valve 270 separating the return flow conduit 32 from the accelerator chamber 260 is drawn upwardly from port 272 as piston 244 moves upwardly in response to engine deceleration and allows return fuel to fill chamber 260. The downward movement of piston 244 closes port 272 by forcing ball 270 into contact therewith. It is noted that a spring 274 and return fuel in return flow conduit 32 cooperate to urge diaphragm 266 and attached needle valve 268 to a closed position and establish the minimum pressure on diaphragm 266 which must be overcome by the pressure exerted by piston 244 on accelerator fuel within chamber 260 if acceleration fuel is to flow to the rosette. This accelerator pump is actuated in response to each depression of the accelerator pedal to deliver an extra amount of fuel to the engine while the rest of the fuel distribution system is catching up to the increased engine load condition. Without said pump the rapid increase in air flow into the intake manifold as the throttle is opened would cause a lean air-fuel mixture and result in "coughing" and "spitting" of the engine.

The operation of the fuel injection metering unit 10 will be described in relation to a change in static engine operating conditions, that is, constant engine speed and load. Under said static operating conditions, the combined forces exerted by flyweights 108 and 110 and the fuel in chamber 46 is balanced by the force exerted by the fuel in chamber 22 and the return flow metering disc 66 is maintained stationary at a distance away from orifice 30. In this static condition, the amount of fuel delivered to the rosette distributing chamber 208 is constant and is equal to the constant amount of fuel being delivered to the system by the pump less the constant amount of fuel being returned to the fuel tank through the return flow conduit 32. If this static condition represents the engine during normal driving speed, the pressure in chamber 52 has no noticeable effect on the operation of the unit and may be disregarded. It is only during idling and very low engine speeds that the pressure differential across diaphragm 44 becomes significant.

As the throttle valve 56 is moved to a more open position by the depression of the engine accelerator, an increase in manifold pressure is transmitted to the load sensor piston through conduit 158 and moves said piston down to thereby move the load metering needle 152 to a more open position with respect to the load metering orifice 154. The pressure differential existing across said orifice is consequently decreased as more fuel is allowed to flow into chamber 48. This decrease in pressure differential causes the flow through orifice 154 to deviate from the desirable flow which is substantially directly proportional to engine speed. To correct this condition and bring the pressure differential across said orifice up to a value where the flow of fuel therethrough is substantially directly proportional to engine speed, the fuel pressure in speed chamber 22 and load sensor chamber 36 communicating therewith is increased. This increase in pressure is accomplished by moving the return flow metering valve disc 66 closer to orifice 30 by the increased force transmitted by the flyweights 108 and 110 as the engine speed is increased and by the increased pressure in chamber 46 caused by the increased flow of fuel into the downstream chamber 48 of the load sensor. When the forces transmitted by said flyweights and the fuel in said chamber 46 once again balance the force transmitted in the opposite direction by the fuel in chamber 22, the flow of fuel through orifice 154 will be substantially directly proportional to the speed of the engine and will correspond to the flow of air into the intake manifold.

I claim:

1. A mechanism for controlling a fuel metering valve of a fuel injection system for an internal combustion engine, said engine having an intake manifold communicating with said engine, said mechanism comprising a fluid pressure chamber having fluid conduit means extending therefrom, said conduit means adapted to be operatively connected to said intake manifold to communicate pressure changes occurring therein to said chamber, a thrust element in said chamber movable in response to said pressure changes, a sensing element on said thrust element movable therewith and having a dimension variable in response to changes in atmospheric temperature and pressure, said sensing element being adapted for connection to said fuel metering valve to transmit thereto the metering valve adjusting force of said thrust element and said sensing element to adjust said valve in accordance with changes in engine manifold pressure and changes in atmospheric pressure and temperature.

2. A mechanism for controlling a fuel metering valve of a fuel injection system for an internal combustion engine, said engine having an intake manifold communicating with said engine, said mechanism comprising a fluid pressure chamber having fluid conduit means extending therefrom, said conduit means adapted to be operatively connected to said intake manifold to communicate pressure changes occurring therein to said chamber, thrust means in said chamber comprising a movable element responsive to said pressure changes and sensing means connected with said element for movement therewith, said sensing means having a dimension variable independently of said movable element in response to changes in atmospheric pressure and temperature, and means for connecting said thrust means with said fuel metering valve to adjust same in accordance with the net response of said movable element and said sensing means to said changes in engine manifold pressure and changes in atmospheric pressure and temperature respectively.

3. A mechanism for controlling a fuel metering valve of a fuel injection system for an internal combustion engine, said engine having an intake manifold communicating therewith, said mechanism comprising a cylinder, a portion of said cylinder forming a fluid pressure chamber, fluid conduit means extending from said chamber, said conduit means being operatively connected to said intake manifold to communicate pressure changes occurring therein to said chamber, piston means slidably mounted in said cylinder and movable in response to intake manifold pressure changes transmitted to said chamber, bellows means connected to said piston means and movable therewith, said bellows means being responsive to changes in atmospheric temperature and pressure to change one of its dimensions, said bellows means and said piston means being adapted for connection to said fuel metering valve to adjust same in accordance with changes in engine manifold pressure and in atmospheric pressure and changes in atmospheric temperature.

4. A mechanism for regulating a fuel valve means in the fuel metering unit of a fuel injection system of an internal combustion engine, said engine having an intake manifold communicating therewith, said mechanism comprising a pressure chamber communicating with said intake manifold of said engine to receive pressure signals therefrom, a thrust element reciprocably mounted in said chamber and adapted to move therein in response to said pressure signals, an air tight flexible member exposed to the atmosphere and secured at one of its ends to said thrust element, said flexible member adapted to expand or contract axially of said thrust element in response to variations in atmospheric pressure and temperature, and a linkage means on the other end of said flexible member connecting said flexible member to said fuel valve means of said fuel metering unit to regulate same.

5. A mechanism for regulating a fuel metering valve of a fuel injection system of an internal combustion engine, said engine having an intake manifold, said regulating being in accordance with changes in intake manifold pressure and changes in atmospheric pressure and temperature, said mechanism comprising a housing, a chamber in said housing communicating with said intake manifold to receive pressure signals therefrom, a piston reciprocably mounted in said housing, said piston having a head communicating with said chamber and movable in response to said signals, resilient means in said chamber abutting said head of said piston and resiliently urging said piston in a direction tending to increase the volume of said chamber, an air tight flexible member secured at one end to said piston and movable therewith, said flexible member being secured at its other end to said fuel metering valve, said flexible member being adapted to change its longitudinal dimension independently of movement of said piston and in response to changes in atmospheric pressure and temperature, the movement of said piston and the change in dimension of said member producing a net force acting on said valve to regulate same.

6. In a fuel injection load metering unit for an internal combustion engine having an intake manifold communicating with the cylinders thereof, said unit having a load metering orifice and a load metering member shiftable with respect thereto to regulate the flow of fuel therethrough to said engine, a sensory mechanism comprising a fluid pressure chamber communicating with said intake manifold of said engine to receive pressure signals therefrom, a fluid pressure responsive member reciprocably mounted in said chamber and adapted to move therein in response to said pressure signals, an air tight flexible member secured a tone of its ends to said fluid pressure responsive member and adapted to expand or contract axially of said pressure responsive member in response to variations in atmospheric pressure and temperature, and means on the other end of said flexible member for connecting said load metering member thereto.

7. In a fuel injection load metering unit for an internal combustion engine having an intake manifold communicating with the cylinders thereof, said unit having a load metering orifice and a load metering member shiftable with respect thereto to regulate the flow of fuel therethrough to said engine, a sensory mechanism comprising a fluid pressure chamber communicating with said intake manifold of said engine to receive pressure signals therefrom, a fluid pressure responsive member reciprocably mounted in said chamber and adapted to move therein in response to said pressure signals, an air tight bellows secured at one of its ends to said fluid pressure responsive member and movable therewith, said bellows being responsive to variations in atmospheric pressure and temperature to expand or contract and thereby change its dimensions, and a socket on the other end of said bellows providing a means for connecting said bellows to said load metering member of said load metering unit.

8. In a fuel injection metering unit for an internal combustion engine having an intake manifold communicating with the cylinders thereof, said unit having a load metering orifice and a load metering member shiftable with respect thereto to regulate the flow of fuel therethrough, a sensory mechanism comprising a housing having a fluid pressure chamber therein, said chamber communicating with said intake manifold of said engine to receive pressure signals therefrom, a piston reciprocably mounted in said housing and movable in response to said pressure signals, a spring in said chamber reacting against said housing and said piston and resiliently urging said piston in a direction tending to increase the volume of said chamber, and an air tight flexible member secured at one of its ends to said piston and adapted to be secured at its other end to said load metering member, said flexible member being adapted to change its longitudinal dimension in response to changes in atmospheric pressure and temperature and independently of movement of said piston.

9. A mechanism for regulating a fuel metering valve of a fuel injection metering unit for an internal combustion engine having an intake manifold communicating with the cylinders thereof, said valve having a load metering orifice communicating with said manifold and a load metering member shiftable with respect to said orifice to regulate the flow of fuel therethrough to said engine, said mechanism comprising a housing having a fluid pressure chamber communicating with said intake manifold of said engine to receive pressure signals therefrom, a piston reciprocably mounted in said housing and communicating with said chamber and movable in response to said pressure signals, a spring in said housing reacting against said housing and said piston and resiliently urging said piston in an opposite direction to the movement thereof caused by a decrease in intake manifold pressure, a longitudinally expandable member secured at one of its ends to said piston and at its other end to said fuel metering member, said expandable member having an air pocket therein, said air pocket being responsive to changes in atmospheric temperature and pressure to change its volume and the longitudinal dimension of said expandable member independently of movement of said piston, and a spring reacting against said piston and said expandable member to augment the spring rate of said expandable member.

10. A sensory mechanism for regulating a fuel metering valve of a fuel injection metering unit for an internal combustion engine, said engine having an intake manifold communicating with the cylinders thereof, said valve having a metering orifice and a metering member shiftable with respect to said orifice to regulate the flow of fuel therethrough to said engine, said sensory mechanism comprising a housing having a fluid pressure chamber therein communicating with said intake manifold of said engine through conduit means to receive pressure signals therefrom, a piston reciprocably mounted in said housing and communicating with said chamber and movable in response to said pressure signals, said piston comprising a head having a skirt extending therefrom, said skirt defining a recess open at one end and closed by said head at the other end, a flexible member positioned in said recess and having an air tight air chamber therein, said flexible member being secured at one of its ends to said piston adjacent said open end of said recess, and a reverse acting linkage means connecting the other end of said flexible member to said load metering member, adjustment means on said linkage means to preset said valve in accordance with a particular manifold pressure, atmospheric pressure and atmospheric temperature, said flexible member being adapted to vary its length in response to changes in atmospheric pressure and temperature, resilient means in said recess reacting against said other end of said flexible member and said head and tending to decrease the length of said flexible member to augment the spring rate thereof and resilient means in said fluid pressure chamber acting against said piston with a force opposite in direction to the greater force acting on said piston resulting from a pressure drop in said intake manifold.

References Cited in the file of this patent

UNITED STATES PATENTS

| | | |
|---|---|---|
| 2,414,617 | Summers | Jan. 21, 1947 |
| 2,435,902 | Reggio | Feb. 10, 1948 |
| 2,531,780 | Mock | Nov. 28, 1950 |